(12) United States Patent
Hosomi et al.

(10) Patent No.: US 6,301,541 B1
(45) Date of Patent: Oct. 9, 2001

(54) BRAKING FORCE CONTROL APPARATUS FOR VEHICLE

(75) Inventors: Kazushi Hosomi, Susono; Toshimi Ishikawa; Yasuhito Ishida, both of Anjo, all of (JP)

(73) Assignees: Toyota Jidosha Kabushiki Kaisha, Toyota; Aisin Seiki Kabushiki Kaisha, Kariya, both of (JP)

(*) Notice: Subject to any disclaimer, the term of this patent is extended or adjusted under 35 U.S.C. 154(b) by 0 days.

(21) Appl. No.: 09/583,542

(22) Filed: Jun. 1, 2000

(30) Foreign Application Priority Data

Jun. 8, 1999 (JP) .................................................. 11-160877

(51) Int. Cl.⁷ ....................................................... G06F 7/00
(52) U.S. Cl. .................................. 701/89; 701/69; 701/81; 303/139; 303/149; 303/190; 303/189
(58) Field of Search .................................. 701/69, 70, 73, 701/74, 89, 81, 84; 303/149, 155, 166, 168, 190, 189, 139

(56) References Cited

U.S. PATENT DOCUMENTS

| | | | |
|---|---|---|---|
| 5,043,896 | 8/1991 | Sol | 364/426.02 |
| 5,775,784 | 7/1998 | Koga et al. | 303/152 |
| 5,915,801 | 6/1999 | Taga et al. | 303/152 |
| 5,947,221 | 9/1999 | Taniguchi et al. | 180/197 |
| 5,957,552 | 9/1999 | Claussen et al. | 303/192 |
| 6,076,898 * | 6/2000 | Ota et al. | 303/139 |

FOREIGN PATENT DOCUMENTS

| | | |
|---|---|---|
| 39 33 652 A1 | 4/1991 | (DE) . |
| 8-133054 | 5/1996 | (JP) . |
| WO 96/11826 | 4/1996 | (WO) . |

* cited by examiner

Primary Examiner—William A. Cuchlinski, Jr.
Assistant Examiner—Yonel Beaulieu
(74) Attorney, Agent, or Firm—Oliff & Berridge, PLC

(57) ABSTRACT

Provided is a braking force control apparatus for vehicles capable of performing appropriate vehicle braking even in a road-contactless state of a wheel. The braking force control apparatus is adapted to a four-wheel drive vehicle having a center differential for distributing and transmitting driving force to the front wheels and rear wheels and a braking system capable of exerting braking force on each of the front and rear wheels, based on voluntary switching between braking according to driver's brake-pedal actuation and forced braking independent of the brake-pedal actuation. It is determined whether the vehicle is in an engine brake state and it is then determined whether at least one of the wheels is in the road-contactless state. When an engine brake determining device determines that the vehicle is in the engine brake state and when a road-contactless state determining device determines that at least one of the wheels is in the road-contactless state, the braking force based on the forced braking is exerted on the wheels other than the at least one wheel while the braking force based on the driver's brake-pedal actuation is permitted to be exerted on the at least one wheel.

15 Claims, 7 Drawing Sheets

BRAKING FORCE CONTROL APPARATUS FOR VEHICLE

BACKGROUND OF THE INVENTION

1. Field of the Invention

The present invention relates to a braking force control apparatus for vehicles and a braking force control method for vehicles, which performs control of braking force of the vehicles.

2. Related Background Art

An example of the conventionally known braking force control apparatus is one constructed to detect wheel speeds of driving wheels of a vehicle and apply braking force according to deviation of the wheel speeds of the driving wheels to limit the wheel speeds of the respective driving wheels to within a fixed range, as described in Japanese Patent Application Laid-Open No. 8-133054. This apparatus is intended to restrain slipping or hunting from appearing at the driving wheels, by appropriately controlling the braking force on the driving wheels so as to limit the wheel speeds of the respective driving wheels to within the fixed range.

SUMMARY OF THE INVENTION

The conventional braking force control apparatus of this type, however, presents the following problem when applied to four-wheel drive vehicles equipped with a center differential for distributing the driving force to the front wheels and the rear wheels and absorbing a rotational speed difference between the front and rear axles. If a four-wheel drive vehicle is in an unlocked state of the center differential in order to avoid the tight corner braking phenomenon or the like and travels on an unpaved steep downhill road in that state with use of engine braking, one of the wheels can go into a road-contactless state (in which the wheel loses adhesion to the road) and the engine drag-torque expected to act as braking force to the other wheels will be transmitted to only the wheel in the road-contactless state. In this event sufficient braking force will not be expected from the other wheels. At this time the wheel in the road-contactless state will rotate backward because of the transmission of the engine drag-torque, but the sufficient braking force cannot be expected from the braking of only that wheel, either.

It is also conceivable to assure the sufficient braking of the vehicle by forcedly applying the braking force to the wheels when there occurs such an event of the wheel in the road-contactless state. In this case, however, the master cylinder is kept in a non-communicated state (interrupted state) with respect to the wheel cylinders. If this state continues during the forced braking, the stroke of the brake pedal will be always limited during that braking. Should a hydraulic sensor of the master cylinder break down during the forced braking, a rise in the hydraulic pressure of the master cylinder would not be detected even with driver's actuation of the brake pedal and the stop lamp switch would fail to be switched on, because the stroke of the brake pedal is restricted. This would raise the possibility of failing to release the forced braking, whereby appropriate vehicle braking cannot be made according to the driver's will.

The present invention has been accomplished in order to solve the problem described above and an object of the present invention is, therefore, to provide a braking force control apparatus for vehicles and a braking force control method for vehicles that assures the appropriate vehicle braking even with either of the wheels being in the road-contactless state.

Namely, a braking force control apparatus for vehicles according to the present invention is a braking force control apparatus adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, the braking force control apparatus comprising: engine brake determining means for determining whether the vehicle is in an engine brake state; road-contactless state determining means for determining whether at least one of the wheels is in a road-contactless state; and braking control means for exerting the braking force based on the forced braking on the wheels other than the at least one wheel while permitting the braking force based on the driver's brake-pedal actuation to be exerted on the at least one of the wheels, when the engine brake determining means determines that the vehicle is in the engine brake state and when the road-contactless state determining means determines that the at least one of the wheels is in the road-contactless state.

The braking force control apparatus for vehicles according to the present invention is also characterized in that when the engine brake determining means determines that the vehicle is in the engine brake state and when the road-contactless state determining means determines that the at least one of the wheels is in the road-contactless state, the braking control means permits the braking force based on the driver's brake-pedal actuation to be exerted on wheels associated with part of a plurality of brake lines while exerting the braking force based on the forced braking on the wheels associated with the other lines, and the braking control means changes the lines under permission to exert the braking force based on the driver's brake-pedal actuation and the lines subjected to the braking force based on the forced braking at predetermined timing.

The braking force control apparatus for vehicles according to the present invention is also characterized in that the engine brake determining means, the road-contactless state determining means and the braking control means are ECU.

A braking force control method for vehicles according to the present invention is a braking force control method adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, the braking force control method comprising the steps of: determining whether the vehicle is in an engine brake state; determining whether at least one of the wheels is in a road-contactless state; and exerting the braking force based on the forced braking on the wheels other than the at least one wheel while permitting the braking force based on the driver's brake-pedal actuation to be exerted on the at least one of the wheels, when determining that the vehicle is in the engine brake state and when determining that the at least one of the wheels is in the road-contactless state.

The braking force control method for vehicles according to the present invention is also characterized in that the step of exerting the braking force includes permitting the braking force based on the driver's brake-pedal actuation to be exerted on wheels associated with part of a plurality of brake lines while exerting the braking force based on the forced braking on the wheels associated with the other lines, and changing the lines under permission to exert the braking force based on the driver's brake-pedal actuation and the lines subjected to the braking force based on the forced braking at predetermined timing when determining that the vehicle is in the engine brake state and when determining that the at least one of the wheels is in the road-contactless state, According to the invention described above, the braking ability of the vehicle can be improved by exerting the braking force forcedly on the wheels when the vehicle is running in the engine brake state and when at least one of the wheels is in the road-contactless state. On that occasion the braking force according to the driver's brake-pedal actuation is permitted to be exerted on at least one of the wheels, whereby the driver is allowed to actuate the brake pedal even in the forced braking state. This allows the forced braking state to be released based on the brake-pedal actuation, and the braking of the vehicle can be performed according to the driver's brake-pedal actuation.

Another braking force control apparatus for vehicles according to the present invention is a braking force control apparatus adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, the braking force control apparatus comprising: engine brake determining means for determining whether the vehicle is in an engine brake state; road-contactless state determining means for determining whether at least one of the wheels is in a road-contactless state; and braking control means for exerting the braking force based on the forced braking on the wheels associated with all of a plurality of brake lines and releasing the forced braking with the braking force in predetermined cycles, when the engine brake determining means determines that the vehicle is in the engine brake state and when the road-contactless state determining means determines that the at least one of the wheels is in the road-contactless state.

Another braking force control method for vehicles according to the present invention is a braking force control method adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, the braking force control method comprising the steps of: determining whether the vehicle is in an engine brake state; determining whether at least one of the wheels is in a road-contactless state; and exerting the braking force based on the forced braking on the wheels associated with all of a plurality of brake lines and releasing the forced braking with the braking force in predetermined cycles, when determining that the vehicle is in the engine brake state and when determining that the at least one of the wheels is in the road-contactless state.

According to the invention described above, the braking ability of the vehicle can be improved by exerting the braking force forcedly on the wheels when the vehicle is running in the engine brake state and when at least one of the wheels is in the road-contactless state. In that case, the forced braking of the wheels is released temporarily after a lapse of a fixed time, thereby permitting the driver's brake-pedal actuation. This allows the forced braking state to be released based on the brake-pedal actuation and thus allows the braking of the vehicle to be performed according to the driver's brake-pedal actuation.

The braking force control apparatus for vehicles according to the present invention is also characterized in that the wheels under the forced braking with the braking force are the front wheels. The braking force control apparatus for vehicles according to the present invention is also characterized in that the braking system is a braking system capable of interrupting a fluid path between a master cylinder and wheel cylinders to effect voluntary control of hydraulic pressure at the wheel cylinders. The braking force control apparatus for vehicles according to the present invention is also characterized by comprising brake actuation detecting means for detecting the driver's brake-pedal actuation by detecting a stroke of a brake pedal.

The braking force control method for vehicles according to the present invention is also characterized in that the wheels under the forced braking with the braking force are the front wheels.

The braking force control method for vehicles according to the present invention is also characterized in that the braking system is a braking system capable of interrupting a fluid path between a master cylinder and wheel cylinders to effect voluntary control of hydraulic pressure at the wheel cylinders.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Embodiments of the present invention will be described in detail by reference to the accompanying drawings. In the description of the drawings like elements will be denoted by like symbols and redundant description will be avoided.

(First Embodiment)

Figure 1:
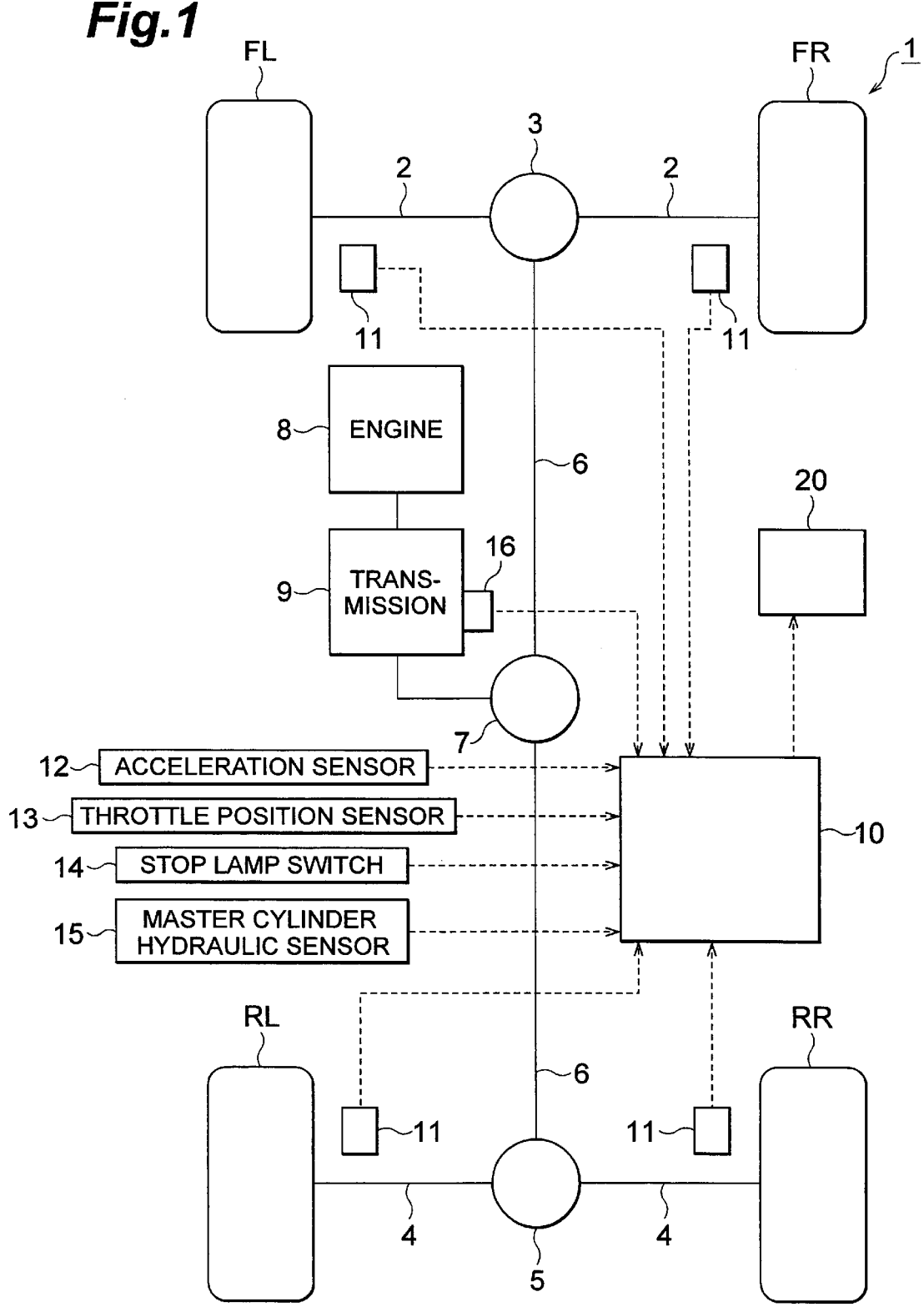
FIG. 1 is a structural diagram of the braking force control apparatus for vehicles according to the first embodiment.

FIG. 1 shows the structure of the braking force control apparatus for vehicles according to the present embodiment. As illustrated in FIG. 1, the braking force control apparatus 1 is installed on a four-wheel drive vehicle and is constructed to control the braking force applied to the driving wheels, the front right wheel FR, the front left wheel FL, the rear right wheel RR, and the rear left wheel RL. The vehicle is provided with a front differential 3 for coupling the front rear wheel FR and the front left wheel FL to each other through drive shafts 2 and a rear differential 5 for coupling the rear right wheel RR and the rear left wheel RL to each other through drive shafts 4.

The vehicle is also equipped with a center differential 7 which couples the front differential 3 and the rear differential 5 to each other through propeller shafts 6. The center differential 7 distributes the driving force transmitted from engine 8 via transmission 9 to the front and rear axles and absorbs a difference between rotational speeds of the front and rear axles.

The braking force control apparatus 1 is equipped with ECU 10. The ECU 10 is composed mainly of a computer including a CPU, a ROM, and a RAM. The ROM stores various control routines including a braking control routine.

The braking force control apparatus 1 is also provided with wheel speed sensors 11. The wheel speed sensors 11 are wheel speed detecting means for detecting rotational speed of each wheel of the vehicle and are set for the respective wheels of the front right wheel FR, the front left wheel FL, the rear right wheel RR, and the rear left wheel RL. The wheel speed sensors 11 are connected each to the ECU 10 and output their respective detection signals to the ECU 10.

The braking force control apparatus 1 also has an acceleration sensor 12, a throttle position sensor 13, a stop lamp switch 14, a master cylinder pressure sensor 15, and a gear position sensor 16. The acceleration sensor 12 is a sensor for detecting positive or negative acceleration applied in the longitudinal direction of the vehicle and is connected to the ECU 10 to output its detection signal to the ECU 10. The throttle position sensor 13 is a sensor for detecting an opening angle (stroke) of the throttle valve not illustrated and is connected to the ECU 10 to output its detection signal to the ECU 10. Whether the driver of the vehicle is under actuation of the accelerator pedal can be determined based on the detection signal from this throttle position sensor 13.

The stop lamp switch 14 functions as brake actuation detecting means for detecting presence or absence of driver's brake-pedal actuation. Specifically, the stop lamp switch 14 is a switch closed when the brake pedal is stepped down by a predetermined stroke, and is connected to the ECU 10. This brake actuation detecting means can also be a means other than the stop lamp switch 14 in certain cases. The master cylinder hydraulic sensor 15 is a sensor for detecting the hydraulic pressure at the master cylinder and is connected to the ECU 10 to output its detection signal to the ECU 10. The gear position sensor 16 is a sensor for detecting the gear position of the transmission 9 and is connected to the ECU 10 to output its detection signal to the ECU 10.

The braking force control apparatus 1 is also provided with a brake actuator 20. The brake actuator 20 is intended to adjust the hydraulic pressure applied to the wheel cylinders of the respective wheels and is constructed, for example, of a plurality of solenoid valves, pump motors, and so on. The brake actuator 20 operates in response to a control signal from the ECU 10.

Figure 2:
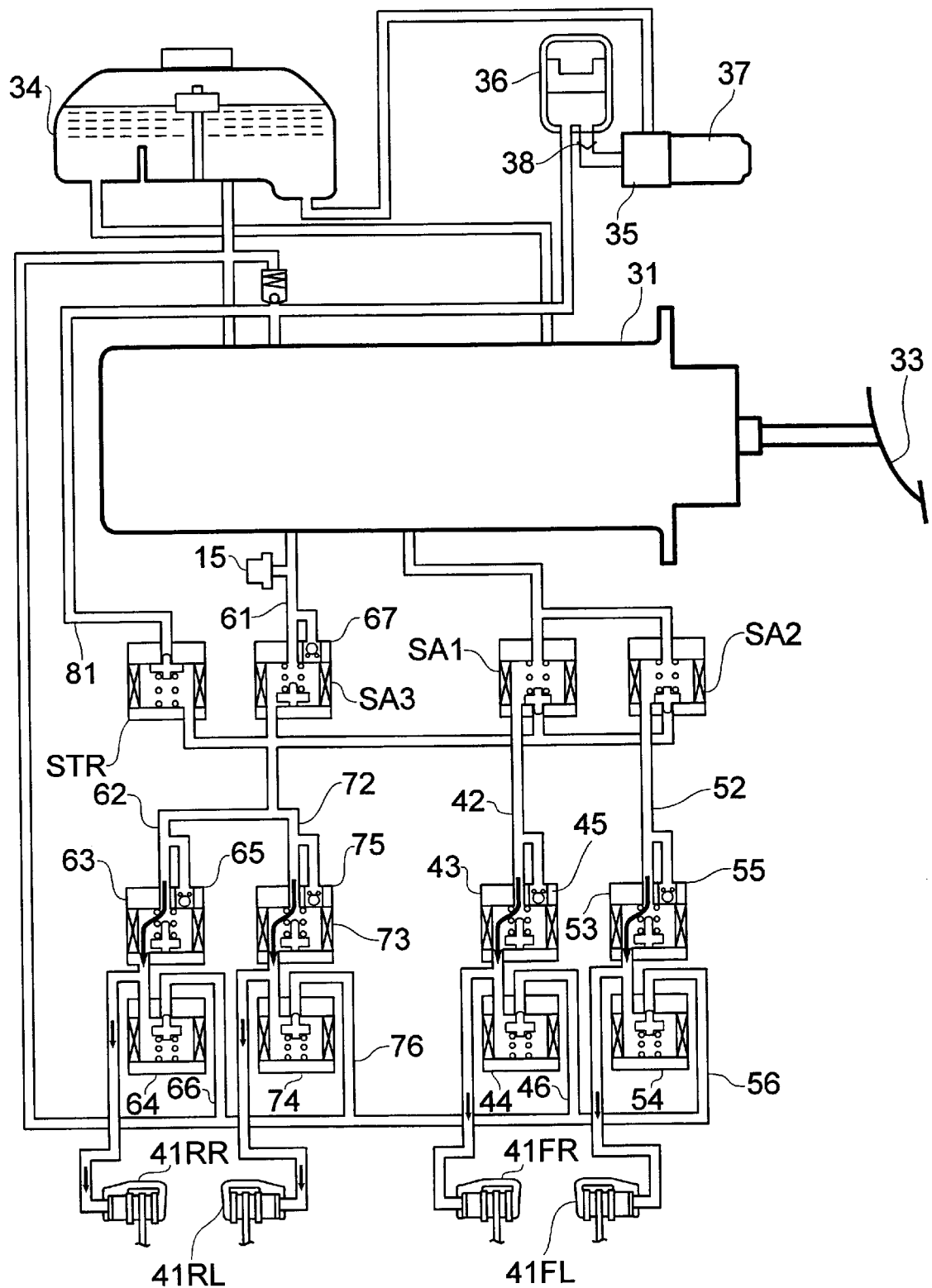
FIG. 2 is an explanatory diagram to explain a brake hydraulic system of the braking force control apparatus according to the first embodiment.

FIG. 2 shows the brake hydraulic system in the braking force control apparatus.

As illustrated in FIG. 2, the brake hydraulic system is constructed in a front and rear distribution pattern as comprised of a hydraulic control system for the front wheels and a hydraulic control system for the rear wheels. This brake hydraulic system is equipped with a master cylinder 31 as hydraulic generating means. The master cylinder 31 acts in accordance with actuation of the brake pedal 33 to generate hydraulic pressure. This master cylinder 31 is one functioning as a brake booster and is connected to a reservoir 34 and via an accumulator 36 to a pump 35 as an auxiliary hydraulic source.

The pump 35 is driven by a motor 37 to boost the pressure of the brake fluid from the reservoir 34 and deliver the boosted fluid via a non-return valve 38 to the accumulator 36 to accumulate the pressure. The motor 37 is actuated when the hydraulic pressure in the accumulator 36 becomes below a predetermined lower limit and is stopped when the hydraulic pressure in the accumulator 36 becomes over a predetermined upper limit. According to this operation, predetermined hydraulic pressure is supplied from the accumulator 36 to the master cylinder 31 as occasion arises, and is also supplied to a fluid path 81 extending toward the wheel cylinders.

The master cylinder 31 receives the hydraulic pressure from the accumulator 36 and generates a hydraulic pressure proportional to a hydraulic pressure as a pilot pressure generated by actuation of the brake pedal 33.

The master cylinder 31 and the wheel cylinder 41FR of the front right wheel FR are connected to each other by a path 42. A selector valve SA1 and a retaining valve 43 are interposed each in the middle of the path 42. The selector valve SA1 is a 3-port 2-position solenoid-controlled valve, which establishes communication between the master cylinder 31 and the wheel cylinder 41FR at the non-actuated position but which cuts off the communication between the master cylinder 31 and the wheel cylinder 41FR while establishing communication between the accumulator 36 and the wheel cylinder 41FR through a path 81, at the actuated position. This selector valve SA1 is actuated in response to a control signal from the ECU 10.

The retaining valve 43 is a 2-port 2-position, normally opened, solenoid-operated valve, which is actuated in response to a control signal from the ECU 10. The valve 43 establishes communication between the master cylinder 31 and the wheel cylinder 41FR at the non-actuated position, but cuts off the communication between the master cylinder 31 and the wheel cylinder 41FR at the non-actuated position. The path 42 is also provided with a non-return valve 45 for bypassing the retaining valve 43.

A path 46 in communication with the reservoir 34 is coupled to a portion between the retaining valve 43 and the wheel cylinder 41FR in the path 42. A pressure reducing valve 44 is provided at a certain point in this path 46. The pressure reducing valve 44 is 2-port 2-position, normally closed, solenoid-operated valve, which is actuated in response to a control signal from the ECU 10. The valve 44 cuts off communication between the wheel cylinder 41FR and the reservoir 34 at the non-actuated position, but establishes the communication between the wheel cylinder 41FR and the reservoir 34 at the actuated position.

The master cylinder 31 and the wheel cylinder 41FL of the front left wheel FL are coupled to each other by a path 52. A selector valve SA2 and a retaining valve 53 are disposed each in the middle of the path 52. The selector valve SA2 is a 3-port 2-position, solenoid-controlled valve, which establishes communication between the master cylinder 31 and the wheel cylinder 41FL at the non-actuated position, but which cuts off the communication between the master cylinder 31 and the wheel cylinder 41FL while establishing communication between the accumulator 36 and the wheel cylinder 41FL, at the actuated position. This selector valve SA2 is actuated in response to a control signal from the ECU 10.

The retaining valve 53 is a 2-port 2-position, normally opened, solenoid-operated valve, which is actuated in response to a control signal of the ECU 10. The valve 53 establishes communication between the master cylinder 31 and the wheel cylinder 41FL at the non-actuated position, but cuts off the communication between the master cylinder 31 and the wheel cylinder 41FL at the actuated position. The path 52 is also provided with a non-return valve 55 for bypassing the retaining valve 53.

A path 56 in communication with the reservoir 34 is coupled to a portion between the retaining valve 53 and the wheel cylinder 41FL in the path 52. A pressure reducing valve 54 is provided at a certain point in this path 56. The pressure reducing valve 54 is a 2-port 2-position, normally closed, solenoid-operated valve, which is actuated in response to a control signal from the ECU 10. The valve 54 cuts off communication between the wheel cylinder 41FL and the reservoir 34 at the non-actuated position, but establishes the communication between the wheel cylinder 41FL and the reservoir 34 at the actuated position.

A path 61 is interposed between the master cylinder 31 and a certain point in the path 81. A selector valve SA3 is disposed at a certain point in the path 61. The selector valve SA3 is a 2-port 2-position, normally opened, solenoid-operated valve, which is actuated in response to a control signal from the ECU 10. The valve SA3 at the non-actuated position keeps the path 61 in a communicated state, but the valve SA3 at the actuated position keeps the path 61 in an interrupted state. The path 61 is also provided with a non-return valve 61 for bypassing the selector valve SA3. This path 61 intersects with the path 81 and further extends toward the wheel cylinders of the rear wheels to be branched into two paths of path 62 and path 72.

The path 62 is coupled to the wheel cylinder 41RR of the rear right wheel RR and is equipped with a retaining valve 63 midway. The retaining valve 63 is a 2-port 2-position, normally opened, solenoid-operated valve, which is actuated in response to a control signal from the ECU 10. The valve 63 establishes communication between the master cylinder 31 and the wheel cylinder 41RR at the non-actuated position, but cuts off the communication between the master cylinder 31 and the wheel cylinder 41RR at the actuated position. The path 62 is also provided with a non-return valve 65 for bypassing the retaining valve 63.

A path 66 in communication with the reservoir 34 is coupled to the path 62 between the retaining valve 63 and the wheel cylinder 41RR. A pressure reducing valve 64 is disposed at a certain point in this path 66. The pressure reducing valve 64 is a 2-port 2-position, normally closed, solenoid-operated valve, which is actuated in response to a control signal from the ECU 10. The valve 64 cuts off communication between the wheel cylinder 41RR and the reservoir 34 at the non-actuated position, but establishes the communication between the wheel cylinder 41RR and the reservoir 34 at the actuated position.

On the other hand, the path 72 is coupled to the wheel cylinder 41RL of the rear left wheel RL and is provided with a retaining valve 73 midway thereof. The retaining valve 73 is a 2-port 2-position, normally opened, solenoid-operated valve, which is actuated in response to a control signal from the ECU 10. The valve 73 establishes communication between the master cylinder 31 and the wheel cylinder 41RL at the non-actuated position, but cuts off the communication between the master cylinder 31 and the wheel cylinder 41RL at the actuated position. The path 72 is also provided with a non-return valve 75 for bypassing the retaining valve 73.

A path 76 in communication with the reservoir 34 is also coupled to the path 72 between the retaining valve 73 and the wheel cylinder 41RL. A pressure reducing valve 74 is disposed at a certain point in this path 76. The pressure reducing valve 74 is a 2-port 2-position, normally closed, solenoid-operated valve, which is actuated in response to a control signal from the ECU 10. The valve 74 cuts off communication between the wheel cylinder 41RL and the reservoir 34 at the non-actuated position, but establishes the communication between the wheel cylinder 41RL and the reservoir 34 at the actuated position.

A selector valve STR is located at a position closer to the accumulator 36 than the intersecting point with the path 61, midway in the path 81. The selector valve STR is a 2-port 2-position, normally closed, solenoid-operated valve, which is actuated in response to a control signal from the ECU 10. The valve STR interrupts the path 81 at the non-actuated position, but establishes communication of the path 81 at the actuated position.

In the above-stated brake hydraulic system, under normal action (without forced braking control), control signals from the ECU 10 keep all the selector valve SA1, selector SA2, selector valve SA3, and selector valve STR at their non-actuated position, whereby the selector valve SA1 maintains the master cylinder 31 and the wheel cylinder 41FR in communication with each other, the selector valve SA2 maintains the master cylinder 31 and the wheel cylinder 41FL in communication with each other, the selector valve SA3 is in the opened state, and the selector valve STR is in the closed state.

During the normal operation, all the retaining valves 43, 53, 63, and 73 and the pressure reducing valves 44, 54, 64, and 74 are kept at their non-actuated position, whereby all the retaining valves 43, 53, 63, and 73 are in the opened state and all the pressure reducing valves 44, 54, 64, and 74 are in the closed state.

This causes the hydraulic pressure of the master cylinder 31 to be transferred through the path 62 and path 72 to the wheel cylinders 41RR, 41RL and causes the hydraulic pressure of the master cylinder 31 to be transferred through the path 42 and path 52 to the wheel cylinders 41FR, 41FL, thereby yielding the braking force according to the driver's brake-pedal actuation.

On the other hand, this brake hydraulic system allows the braking force to be exerted forcedly on the wheel cylinders 41FR, 41FL of the front wheels, by closing the selector valve SA1, selector valve SA2, and selector valve SA3 and appropriately opening the selector valve STR. The system also allows the braking force to be exerted forcedly on the wheel cylinders 41RR, 41RL of the rear wheels, by closing the selector valve SA3 and appropriately opening the selector valve STR.

The brake hydraulic system of the braking force control apparatus for vehicles according to the present invention is not limited to the one described above, but may be any other system as long as it allows voluntary switching between the braking force according to the driver's brake-pedal actuation and the forced braking force independent of the driver's brake-pedal actuation and application thereof to each of the front right wheel FR, front left wheel FL, rear right wheel RR, and rear left wheel RL as the driving wheels.

The operation of the braking force control apparatus will be described below.

Figure 3:
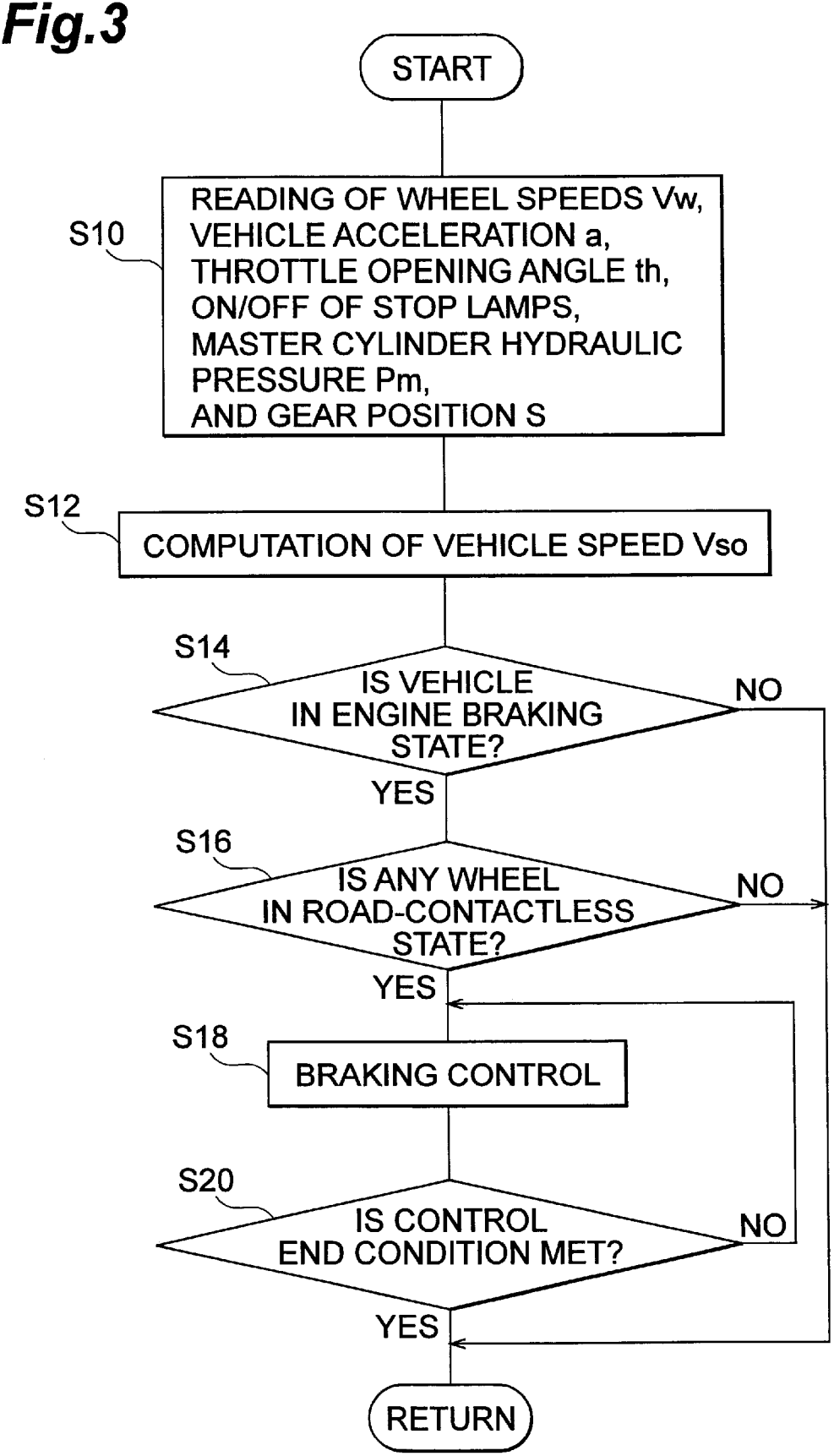
FIG. 3 is a flowchart to show the operation of the braking force control apparatus according to the first embodiment.

FIG. 3 is a flowchart to show the operation of the braking force control apparatus. In FIG. 3, control processing is initiated with on of the ignition switch and the first step S10 (which will be referred to simply as "S10"; the other steps will also be denoted in similar fashion) is a step of reading the wheel speeds Vw at the respective wheels, the vehicle acceleration a, the throttle opening angle th of the throttle valve, the on/off state of the stop lamps, the master cylinder pressure Pm of the master cylinder 31, and the gear position S of the transmission 9.

The reading of the wheel speeds Vw is carried out based on the output signals detected by the wheel speed sensors 11 at the respective wheels of the front right wheel FR, front left wheel FL, rear right wheel RR, and rear left wheel RL and based on the vehicle acceleration computed from the outputs of the vehicle speed sensors 11. The reading of the vehicle acceleration a is carried out based on the output signal of the acceleration sensor 12. The reading of the throttle opening angle th is carried out based on the output signal of the throttle position sensor 13. The reading of the on/off state of the stop lamps is carried out based on the state of the stop lamp switch 14. The reading of the hydraulic pressure Pm of the master cylinder 31 is carried out based on the output signal of the master cylinder pressure sensor 15. Further, the reading of the gear position S of the transmission 9 is carried out based on the output signal of the gear position sensor 16.

Then the flow transfers to S12 to compute the vehicle speed Vso of the vehicle. This computation of the vehicle speed Vso is carried out by estimating the vehicle speed Vso, based on the wheel speeds Vw of the wheels read in S10.

Then the flow transfers to S14 to determine whether the vehicle is running in the engine brake state. The determination of the engine brake state of the vehicle is carried out, for example, based on whether driver's accelerator-pedal actuation is under way, whether driver's brake-pedal actuation is under way, whether the vehicle is under deceleration, and whether the gear position S of the transmission 9 is low.

In this case, whether the driver's accelerator-pedal actuation is under way is judged based on the throttle opening angle th and whether the driver's brake-pedal actuation is under way is judged based on the on/off state of the stop lamps. Whether the vehicle is under deceleration is judged based on the vehicle acceleration a.

It is then determined that the vehicle is running in the engine brake state when the following conditions are met; the driver's accelerator-pedal actuation is not under way, the driver's brake-pedal actuation is not under way, the vehicle is under deceleration, and the gear position S of the transmission 9 is low. On the other hand, it is determined that the vehicle is not running in the engine brake state when either condition is met; the driver's accelerator-pedal actuation is under way, the driver's brake-pedal actuation is under way, the vehicle is not under deceleration, or the gear position S of the transmission 9 is not low.

This determination in S14 about whether the vehicle is in the engine brake state may also be carried out by any other technique than the above determination as long as the engine brake state of the vehicle can be judged.

When it is determined in S14 that the vehicle is not running in the engine brake state, the control processing is terminated. When it is determined on the other hand that the vehicle is running in the engine brake state, the flow moves to S16 to determine whether either of the wheels is in the road-contactless state. This determination is made, for example, based on whether a difference between the estimated vehicle speed Vso and the wheel speed Vw of either one wheel is greater than a set value A ((Vso−Vw)>A). This set value A is a value preset in the ECU 10.

When it is determined in S16 that neither of the wheels is in the road-contactless state, the control processing is terminated. When it is determined in S16 on the other hand that either of the wheels is in the road-contactless state, the flow moves to S18 to carry out the braking control.

In the braking control, a control signal is first outputted from the ECU 10 to the actuator 20 to open the selector valve STR and the selector valve SA3. This establishes a state in which the hydraulic pressure of the accumulator 36 is able to be transferred through the path 81 to the wheel cylinders 41 of the front right wheel FR, front left wheel FL, rear right wheel RR, and rear left wheel RL. At the same time as it, the retaining valve 63 and retaining valve 73 are closed. This intercepts the transfer of the hydraulic pressure from the accumulator 36 to the wheel cylinders 41RR, 41RL of the rear wheels.

Figure 4:
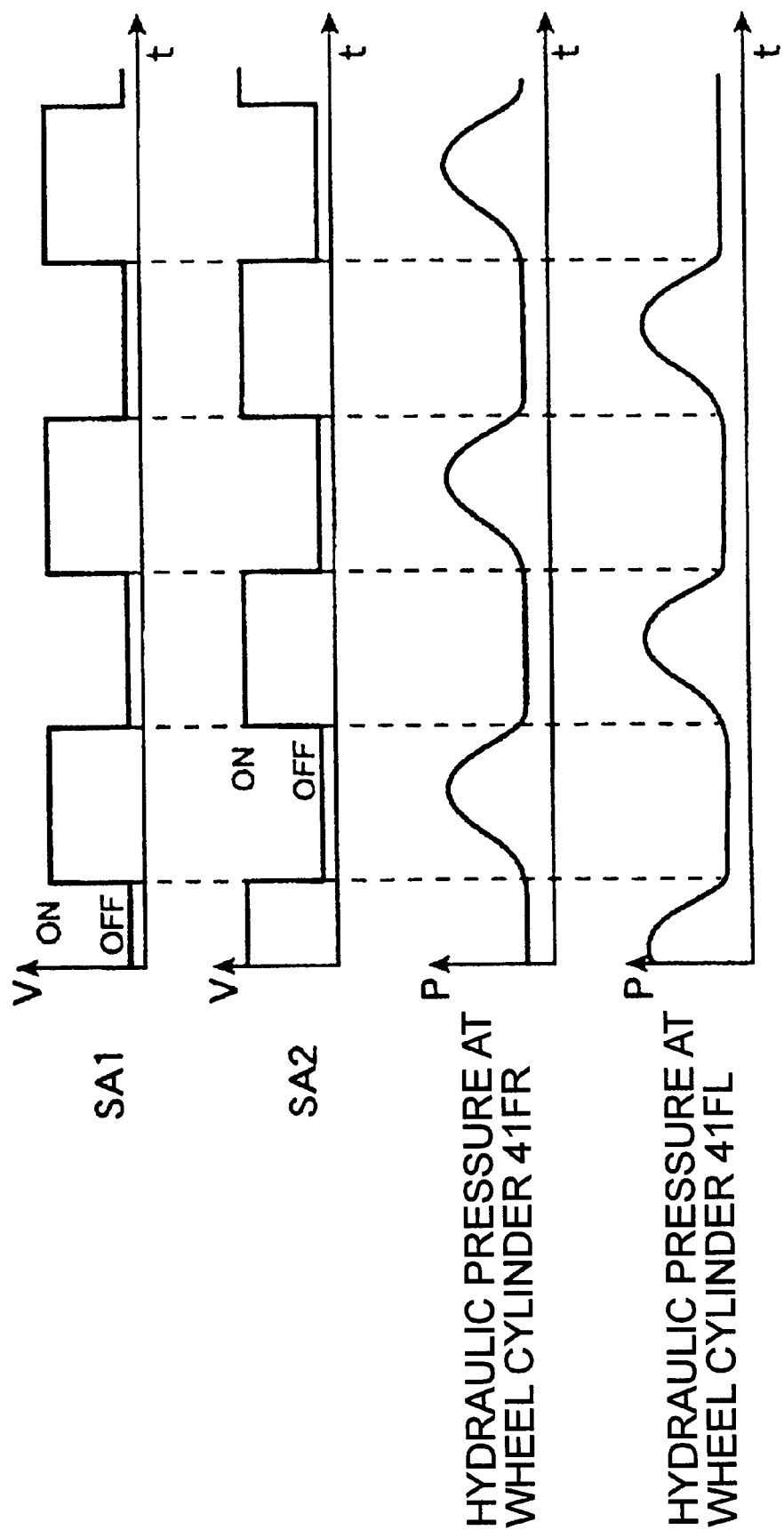
FIG. 4 is an explanatory diagram to explain the operation of the braking force control apparatus according to the first embodiment.

On the other hand, the selector valve SA1 and the selector valve SA2 are switched alternately between the actuated position (ON) and the non-actuated position (OFF), as illustrated in FIG. 4. This causes the wheel cylinder 41FR of the front right wheel FR and the wheel cylinder 41FL of the front left wheel FL to be connected alternately to the master cylinder 31 or to the accumulator 36. In this case, when the wheel cylinder 41FR or the wheel cylinder 41FL is connected to the accumulator 36, the hydraulic pressure rises to apply the braking force forcedly. When the wheel cylinder 41FR or the wheel cylinder 41FL is connected to the master cylinder 31, the hydraulic pressure drops, so that the driver is allowed to actuate the brake pedal.

Therefore, the driver is allowed to actuate the brake pedal during the braking control of S18, and the braking control can be terminated by the driver's will in S20 described hereinafter, thereby permitting the braking of the vehicle according to the driver's will.

Figure 5:
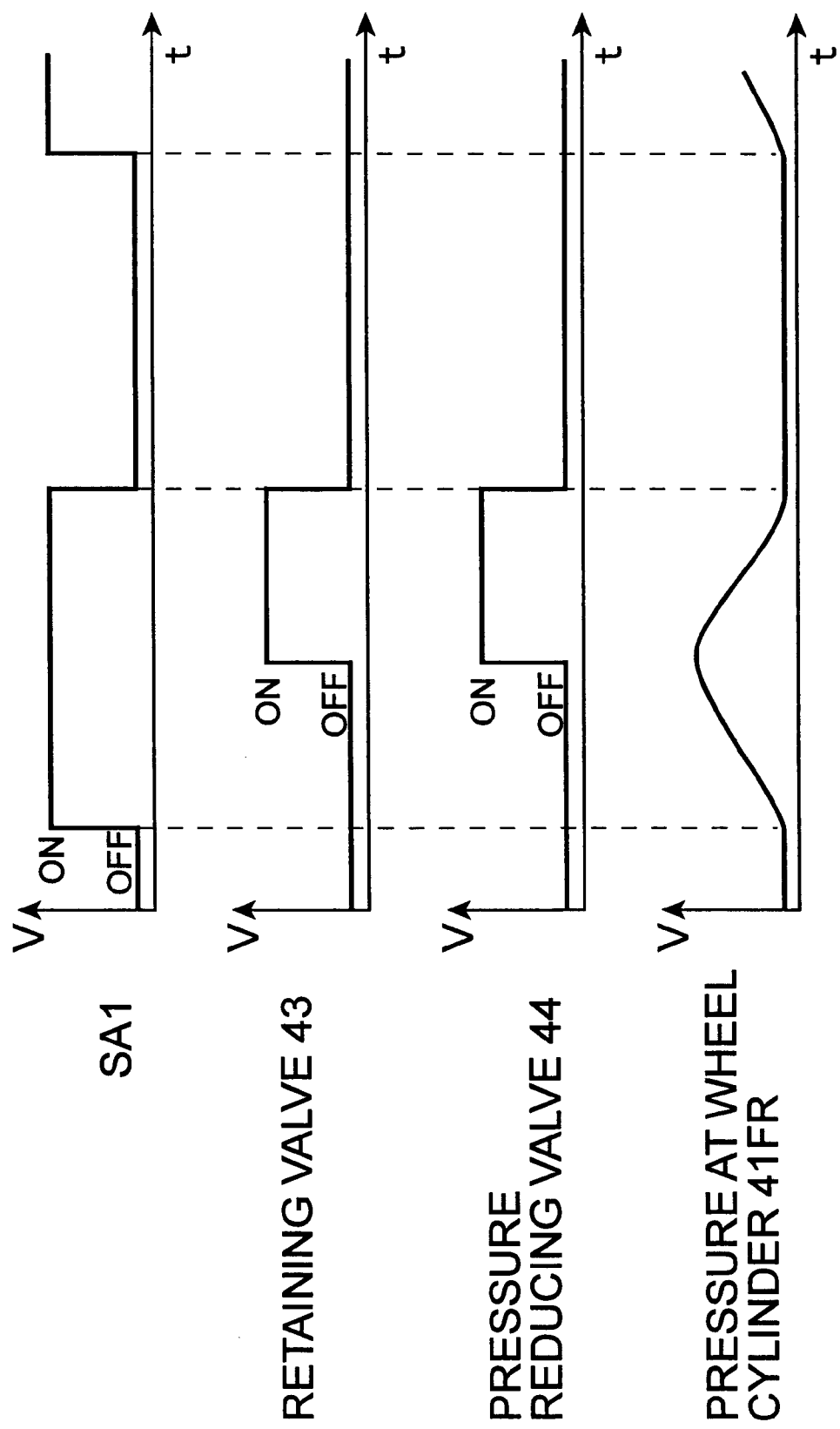
FIG. 5 is an explanatory diagram to explain the operation of the braking force control apparatus according to the first embodiment.

As illustrated in FIG. 5, the retaining valve 43 and the pressure reducing valve 44 are kept at the non-actuated position (OFF) in a first half of each of the periods in which the selector valve SA1 is kept at the actuated position (ON). At this time, the retaining valve 43 is opened at the non-actuated position and the pressure reducing valve 44 is closed at the non-actuated position. Therefore, the hydraulic pressure of the accumulator 36 is transferred to the wheel cylinder 41FR in the first half of each period in which the selector valve SA1 is kept at the actuated position (ON), to increase the hydraulic pressure at the wheel cylinder 41FR.

On the other hand, in a second half of each of the periods in which the selector valve SA1 is kept at the actuated position (ON), the retaining valve 43 and pressure reducing valve 44 are kept at the actuated position (ON). At this time, the retaining valve 43 is closed at the actuated position and the pressure reducing valve 43 is opened at the actuated position. This causes the wheel cylinder 41FR to be connected through the pressure reducing valve 44 and path 46 to the reservoir 34 in the second half of each period in which the selector valve SA1 is kept at the actuated position (ON), thereby decreasing the hydraulic pressure at the wheel cylinder 41FR.

In FIG. 5, during the periods in which the selector valve SA1 is kept at the non-actuated position (OFF), the wheel cylinder 41FR is connected to the master cylinder 31, as described above, so that the driver of the vehicle is allowed to activate the normal braking.

The relation between actuation timing of the selector valve SA2, retaining valve 53, and pressure reducing valve 54 and hydraulic pressure at the wheel cylinder 41FL is similar to that between actuation timing of the selector valve SA1, retaining valve 43, and pressure reducing valve 44 and hydraulic pressure at the wheel cylinder 41FR described above and thus the description thereof is omitted herein.

Then the flow transfers to S20 of FIG. 3 to determine whether an end condition of the braking control is met. This end condition of the braking control is either a condition that the hydraulic pressure of the master cylinder 31 becomes larger than a preset value, a condition that the stop lamp switch 14 becomes on, a condition that the vehicle is released from the engine brake state, or a condition that neither of the wheels is in the road-contactless state.

When it is determined in S20 that the end condition of the braking control is not met, the flow returns to S18. On the other hand, when it is determined that the end condition of the braking control is met, the braking control processing is terminated.

As described above, the braking force control apparatus 1 according to the present embodiment can improve the braking ability of the vehicle by forcedly applying the braking force to the wheels when the vehicle is running in the engine brake state and when at least one of the wheels is in the road-contactless state.

When the vehicle is running in the engine brake state and when at least one of the wheels is in the road-contactless state, the driver is permitted to exert the braking force on at least one of the wheels by actuating the brake pedal. This allows the driver to actuate the brake pedal even in the forced braking state of the vehicle. Therefore, the forced braking state can be released based on the brake-pedal actuation and the braking of the vehicle can be effected according to the driver's brake-pedal actuation. Namely, the stroke of the brake pedal 33 would be always limited during the braking control in case of the structure in which the selector valve SA1, selector valve SA2, and selector valve SA3 are actuated during the forced braking state (braking control) to bring the master cylinder 31 into the non-communicated state (interrupted state) with respect to all the wheel cylinders 41 and in which this state is maintained during the braking control. If there should occur a breakdown of the master cylinder pressure sensor 15 during the braking control, no rise would be detected in the hydraulic pressure of the master cylinder 31 under the driver's brake-pedal actuation and the stop lamp switch 14 would not be switched on, because the stroke of the brake pedal 33 is limited. This does not satisfy the control end condition in S20 of FIG. 3, thereby raising the possibility that the forced braking state cannot be released by the driver's will. In contrast with it, the braking force control apparatus 1 according to the present embodiment allows the driver to actuate the brake pedal (the stroke of the brake pedal) even in the forced braking state, so that the forced braking state can be released by the driver's will.

The braking force control apparatus 1 according to the present embodiment is advantageous in exerting the braking force on the vehicle with reliability and in assuring the braking operation according to the driver's will, particularly, under running with the center differential 7 free (without differential locking) and in the engine brake state on an unpaved steep downhill road.

The apparatus also has the effect that the determination of braking can be made without time lag, because the braking force is applied to one of the left and right wheels by the driver's brake-pedal actuation in the front-axle brake circuit under the forced application of braking force.

(Second Embodiment)

The braking force control apparatus 1 according to the first embodiment described above was constructed to switch the selector valve SA1 and the selector valve SA2 alternately between the actuated position (ON) and the non-actuated position (OFF) under the conditions that the vehicle was running in the engine brake state and that at least one of the wheels was in the road-contactless state, whereas the braking force control apparatus according to the present embodiment is constructed to switch the selector valve SA1 and the selector valve SA2 simultaneously to the actuated position (ON) or to the non-actuated position (OFF), or to switch the selector valve SA1 and the selector valve SA2 with a time difference to the actuated position (ON) or to the non-actuated position (OFF).

The braking force control apparatus according to the present embodiment has the structure similar to the braking force control apparatus 1 according to the first embodiment illustrated in FIG. 1 and is provided with the brake hydraulic system similar to that illustrated in FIG. 2.

Figure 6:
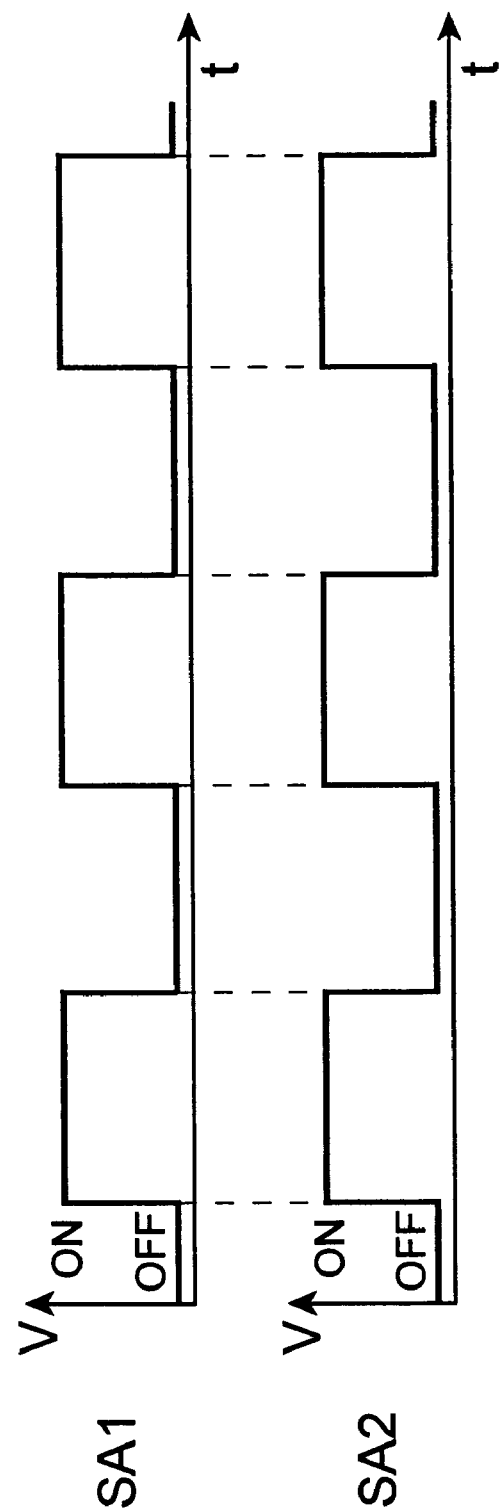
FIG. 6 is an explanatory diagram to explain the operation of the braking force control apparatus according to the second embodiment.
Figure 7:
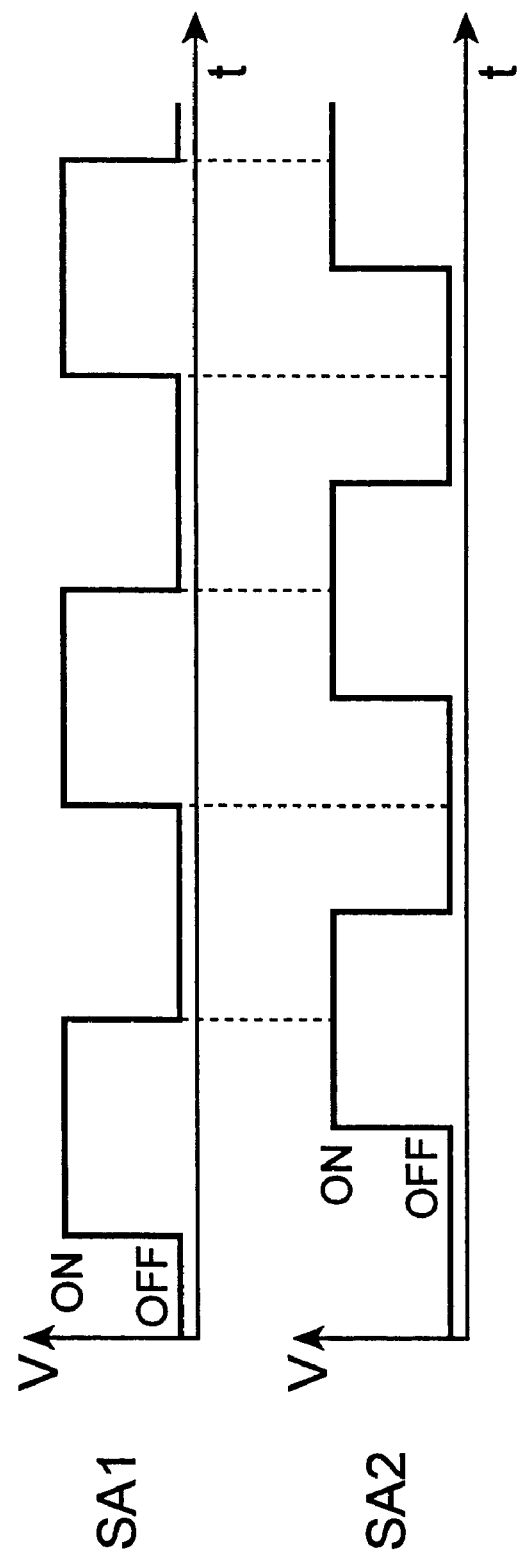
FIG. 7 is an explanatory diagram to explain the operation of the braking force control apparatus according to the second embodiment.

FIG. 6 and FIG. 7 show the operation timing of the selector valve SA1 and the selector valve SA2 in the braking force control apparatus according to the present embodiment.

In the braking force control apparatus according to the present embodiment, when it is determined that the vehicle is running in the engine brake state and that either of the wheels is in the road-contactless state, the braking control is carried out in such a manner that the selector valve SA1 and selector valve SA2 are switched simultaneously to the actuated position (ON) and that at a given time thereafter they are switched simultaneously to the non-actuated position (OFF), as illustrated in FIG. 6. The selector valve SA1 and the selector valve SA2 undergo repetition of the simultaneous switching between the actuated position and the non-actuated position in fixed cycles.

In another braking control as illustrated in FIG. 7, after the selector valve SA1 is switched to the actuated position (ON) and before the selector valve SA1 is switched to the non-actuated position (OFF), the selector valve SA2 is switched to the actuated position. The selector valve SA1 and the selector valve SA2 undergo repetition of the switching between the actuated position and the non-actuated position in fixed cycles while the selector valve SA2 lags behind the selector valve SA1 by about a quarter cycle.

The braking force control apparatus and the braking force control method according to the present embodiment as described above can also improve the braking ability of the vehicle by forcedly exerting the braking force on the wheels under the conditions that the vehicle is running in the engine brake state and that at least one of the wheels is in the road-contactless state, as the braking force control apparatus 1 according to the first embodiment can.

In the braking force control apparatus and the braking force control method according to the present embodiment, the driver is allowed to actuate the brake pedal, because the forced braking of the wheels is released temporarily after the given time, under the conditions that the vehicle is running in the engine brake state and that at least one of the wheels is in the road-contactless state. Therefore, the forced braking state can be released based on the brake-pedal actuation and the braking of the vehicle can be achieved according to the driver's brake-pedal actuation.

As described above, according to the present invention, the braking ability of the vehicle can be improved by forcedly exerting the braking force on the wheels under the conditions that the vehicle is running in the engine brake state and that at least one of the wheels is in the road-contactless state. In that case, the driver is allowed to actuate the brake pedal even in the forced braking state, because the braking force based on the driver's brake-pedal actuation is permitted to be exerted on at least one of the wheels. This permits the forced braking state to be released based on the brake-pedal actuation, and thus the braking of the vehicle can be accomplished according to the driver's brake-pedal actuation.

When the apparatus is constructed in the structure wherein, under the conditions that the vehicle is running in the engine brake state and that at least one of the wheels is in the road-contactless state, the braking force is exerted forcedly on the wheels associated with all the plurality of brake lines and the forced application of the braking force is released in predetermined cycles, the driver is allowed to actuate the brake pedal during the release. Therefore, the forced braking state can be released based on the brake-pedal actuation and the braking of the vehicle can be accomplished according to the driver's brake-pedal actuation.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A braking force control apparatus adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, said braking force control apparatus comprising:

engine brake determining means for determining whether said vehicle is in an engine brake state;
   road-contactless state determining means for determining whether at least one of said wheels is in a road-contactless state; and
   braking control means for exerting the braking force based on said forced braking on the wheels other than said at least one wheel while permitting the braking force based on said driver's brake-pedal actuation to be exerted on said at least one of the wheels, when said engine brake determining means determines that said vehicle is in the engine brake state and when said road-contactless state determining means determines that said at least one of the wheels is in the road-contactless state.

2. A braking force control apparatus adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, said braking force control apparatus comprising:

ECU which can determine whether said vehicle is in an engine brake state, determine whether at least one of said wheels is in a road-contactless state and exert the braking force based on said forced braking on the wheels other than said at least one wheel while permitting the braking force based on said driver's brake-pedal actuation to be exerted on said at least one of the wheels, when said engine brake determining means determines that said vehicle is in the engine brake state and when said road-contactless state determining means determines that said at least one of the wheels is in the road-contactless state.

3. The braking force control apparatus according to claim 1, wherein when said engine brake determining means determines that said vehicle is in the engine brake state and when said road-contactless state determining means determines that said at least one of the wheels is in the road-contactless state, said braking control means permits the braking force based on said driver's brake-pedal actuation to be exerted on wheels associated with part of a plurality of brake lines while exerting the braking force based on said forced braking on the wheels associated with the other lines, and said braking control means changes the lines under permission to exert the braking force based on said driver's brake-pedal actuation and the lines subjected to the braking force based on said forced braking at predetermined timing.

4. The braking force control apparatus according to claim 1, wherein said engine brake determining means, said road-contactless state determining means and said braking control means are ECU.

5. A braking force control apparatus adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, said braking force control apparatus comprising:

engine brake determining means for determining whether said vehicle is in an engine brake state;
   road-contactless state determining means for determining whether at least one of said wheels is in a road-contactless state; and
   braking control means for exerting the braking force based on the forced braking on the wheels associated with all of a plurality of brake lines and releasing said forced braking with the braking force in predetermined cycles, when said engine brake determining means determines that said vehicle is in the engine brake state and when said road-contactless state determining means determines that said at least one of the wheels is in the road-contactless state.

6. The braking force control apparatus according to claim 5, wherein said engine brake determining means, said road-contactless state determining means and said braking control means are ECU.

7. The braking force control apparatus according to claim 1, wherein said wheels under the forced braking with the braking force are the front wheels.

8. The braking force control apparatus according to claim 1, wherein said braking system is a braking system capable of interrupting a fluid path between a master cylinder and wheel cylinders to effect voluntary control of hydraulic pressure at said wheel cylinders.

9. The braking force control apparatus according to claim 1, comprising brake actuation detecting means for detecting the driver's brake-pedal actuation by detecting a stroke of a brake pedal.

10. The braking force control apparatus according to claim 9, wherein said brake actuation detecting means is a stop lamp switch.

11. A braking force control method adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, said braking force control method comprising the steps of:

determining whether said vehicle is in an engine brake state;

determining whether at least one of said wheels is in a road-contactless state; and exerting the braking force based on said forced braking on the wheels other than said at least one wheel while permitting the braking force based on said driver's brake-pedal actuation to be exerted on said at least one of the wheels, when determining that said vehicle is in the engine brake state and when determining that said at least one of the wheels is in the road-contactless state.

12. The braking force control method according to claim 11, wherein the step of exerting the braking force includes permitting the braking force based on said driver's brake-pedal actuation to be exerted on wheels associated with part of a plurality of brake lines while exerting the braking force based on said forced braking on the wheels associated with the other lines, and changing the lines under permission to exert the braking force based on said driver's brake-pedal actuation and the lines subjected to the braking force based on said forced braking at predetermined timing when determining that said vehicle is in the engine brake state and when determining that said at least one of the wheels is in the road-contactless state.

13. A braking force control method adapted to a four-wheel drive vehicle comprising a center differential for distributing and transmitting driving force to front wheels and rear wheels, and a braking system capable of exerting braking force on a specific wheel, based on voluntary switching between braking according to driver's brake-pedal actuation and forced braking independent of the brake-pedal actuation, said braking force control method comprising the steps of:

determining whether said vehicle is in an engine brake state;

determining whether at least one of said wheels is in a road-contactless state; and exerting the braking force based on the forced braking on the wheels associated with all of a plurality of brake lines and releasing said forced braking with the braking force in predetermined cycles, when determining that said vehicle is in the engine brake state and when determining that said at least one of the wheels is in the road-contactless state.

14. The braking force control method according to claim 11, wherein said wheels under the forced braking with the braking force are the front wheels.

15. The braking force control method according to claim 11, wherein said braking system is a braking system capable of interrupting a fluid path between a master cylinder and wheel cylinders to effect voluntary control of hydraulic pressure at said wheel cylinders.

* * * * *